United States Patent [19]
Vinciarelli

[11] Patent Number: 5,720,324
[45] Date of Patent: Feb. 24, 1998

[54] FILLING OF ASSEMBLIES

[75] Inventor: Patrizio Vinciarelli, Boston, Mass.

[73] Assignee: VLT Corporation, San Antonio, Tex.

[21] Appl. No.: 582,634

[22] Filed: Jan. 4, 1996

Related U.S. Application Data

[63] Continuation of Ser. No. 246,509, May 20, 1994, abandoned.

[51] Int. Cl.$^6$ .................................................. B65B 1/14
[52] U.S. Cl. .................... 141/1; 141/5; 141/9; 141/34; 141/95; 141/96; 141/198; 141/283; 73/290 R; 73/290 B; 73/304 C
[58] Field of Search .................... 141/1, 5, 9, 34, 141/83, 95, 96, 105, 107, 198, 270, 279, 283; 73/290 B, 290 R, 304 C

[56] References Cited

U.S. PATENT DOCUMENTS

| 2,622,780 | 12/1952 | Ackerman | 141/283 X |
|---|---|---|---|
| 3,391,547 | 7/1968 | Kingston | 141/198 X |
| 3,520,337 | 7/1970 | Irland et al. | 141/34 X |
| 4,267,866 | 5/1981 | Larsson et al. | 141/1 |
| 4,446,896 | 5/1984 | Campagna | 141/198 |
| 4,648,432 | 3/1987 | Mechalas | 141/5 X |
| 4,880,039 | 11/1989 | Horak | 141/1 |
| 5,148,841 | 9/1992 | Graffin | 141/83 |
| 5,182,545 | 1/1993 | Goekler et al. | 73/304 C X |

FOREIGN PATENT DOCUMENTS

| 2133392 | 4/1995 | Canada | B29C 33/10 |
|---|---|---|---|
| 0 141 531 | 5/1985 | European Pat. Off. | |
| 2 302 179 | 9/1976 | France | |
| 491 733 | 7/1970 | Germany | |
| 3804674 A1 | 8/1989 | Germany | |
| 59-9014 | 1/1984 | Japan | |
| 59-9015 | 1/1984 | Japan | |
| 1-267009 | 1/1990 | Japan | |
| 4-500432 | 1/1992 | Japan | |
| 2 241 465 | 12/1990 | United Kingdom | B29C 67/18 |
| WO 90/15709 | 12/1990 | WIPO | |

*Primary Examiner*—J. Casimer Jacyna
*Attorney, Agent, or Firm*—Fish & Richardson P.C.

[57] ABSTRACT

Free space within a chamber is filled with a flowable material via an opening in a surface of the chamber. A delivery force is used to deliver the flowable material into the chamber via the opening. An outwardly directed force, independent of the delivery force, is applied to draw the flowable material away from the opening. The extent to which the free space within the chamber has been filled is sensed. And the delivering of the flowable material is controlled in response to the sensing. A wall of the chamber defines a longer dimension and a shorter dimension and the opening is in a portion of the wall that defines the longer dimension. The flowable material is delivered into the chamber via the opening in a manner such that, as the flowable material fills the chamber, a surface of the flowable material moves toward the opening along the longer dimension of the chamber. The approach of the surface of the flowable material toward the opening is sensed as an indication of the extent to which the free space within the chamber has been filled.

28 Claims, 10 Drawing Sheets

FILLING OF ASSEMBLIES

This is a continuation of application Ser. No. 08/246,509, filed May 20, 1994, now abandoned.

BACKGROUND

This invention relates to filling of assemblies.

Figure 1:
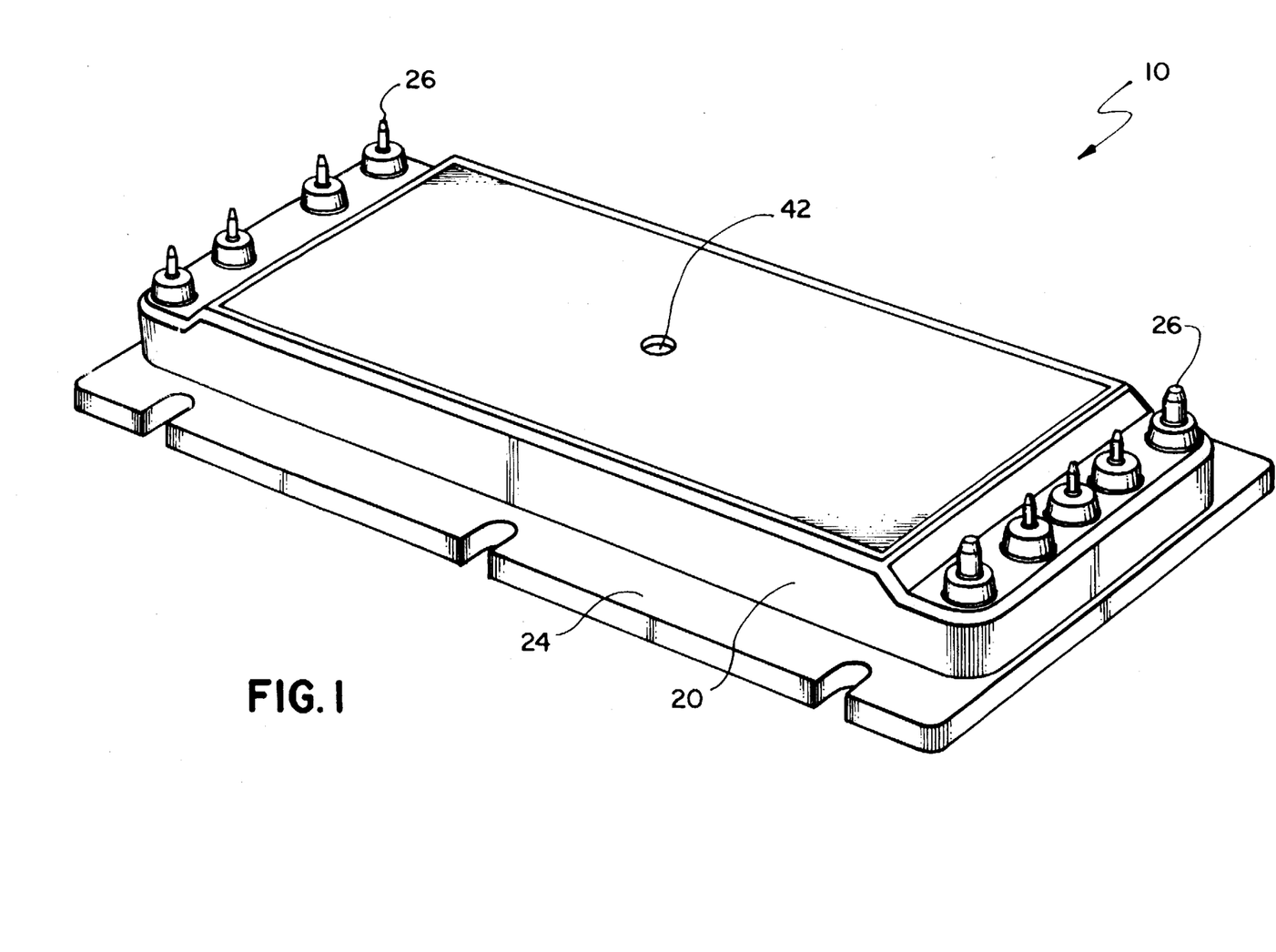
FIG. 1 is a perspective view of a packaged DC—DC converter.

Electronic and electromechanical assemblies, for example, are often filled with encapsulating materials (e.g., epoxy, silicone rubber) or other liquid materials (e.g., impregnants) during manufacture. Among the functions performed by the filling materials are electrical insulation; mechanical rigidity and support; removal of heat from within the assembly; and protecting components within the assembly from external influences. For example, FIG. 1 shows a packaged DC—DC converter 10. The exterior of the converter includes a plastic case 20 and a metal baseplate 24. Conductive pins 26, for making electrical connections to the converter, extend through the plastic case. Within the converter (FIGS. 2A and 2B) are a printed circuit board assembly 30, to which a variety of electronic components are mounted (e.g., transformer 32; inductor 34). Power semiconductor devices 36, 38, 40 are mounted between the bottom surface of the printed circuit board assembly 30 and the interior surface of the baseplate 24. The plastic case 20 and the baseplate 24 form an enclosure which envelops the printed circuit board assembly and the power devices. In its final stage of assembly the interior of the converter is filled with an epoxy encapsulating material 31 which is used both to provide mechanical strength and to improve heat transfer between internal heat-dissipating components and the outer surfaces of the converter.

Figure 3:
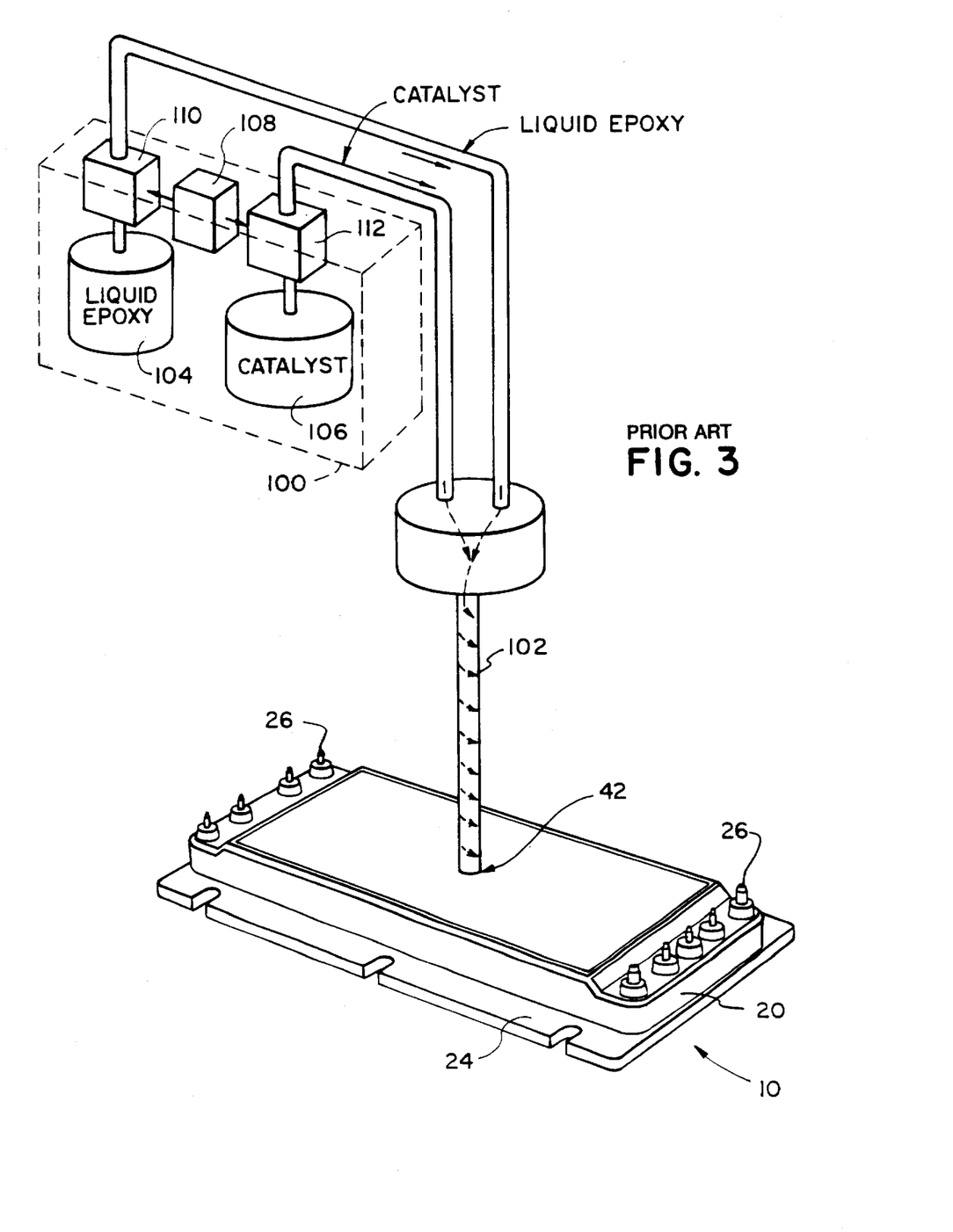
FIG. 3 is a schematic perspective view of a method of filling an assembly with a liquid.

In one known filling process, FIG. 3, a dispensing cart 100 (e.g., Model number CTFSD 2515, manufactured by Liquid Control Corporation, North Canton, Ohio, USA) delivers a mixture of liquid epoxy resin and liquid catalyst to a stationary, horizontally oriented, converter assembly 10. Both the absolute and relative amounts of each liquid delivered (from supply tanks 104, 106 via pump and metering assemblies 110, 112) is controlled by a controller 108 in the cart. The liquids are combined and thoroughly mixed within a static mixing tube 102 (e.g., Static Mixer, Part Number 60/0202/50, also manufactured by Liquid Control Corp.) and the catalyzed epoxy is injected into the interior of the assembly 10 via a fill hole 42 in the plastic case 20. A controlled amount of catalyzed epoxy is thus delivered to the interior of the assembly.

One way to fill an assembly with a liquid is simply to deliver the mixture through the fill hole at essentially atmospheric pressure (referred to as "injection filling"). Another way is to form a seal between the end of the fill tube 102 and the fill hole and pump the liquid into the interior of the converter under pressure (referred to as "pressure filling").

SUMMARY

In general, in one aspect, the invention features a method of filling free space within a chamber with a flowable material via an opening in a surface of the chamber. A delivery force is used to deliver the flowable material into the chamber via the opening. An outwardly directed force, independent of the delivery force, is applied to draw the flowable material away from the opening. The extent to which the free space within the chamber has been filled is sensed. And the delivering of the flowable material is controlled in response to the sensing. Implementations of the invention may include the following features. The delivery force may be gravity or may be associated with pumping of the flowable material through a delivery conduit. The delivering of the flowable material and the applying of the outwardly directed force may occur during overlapping time periods. The outwardly directed force may be a centrifugal force. The sensing may be capacitive sensing. The delivering may be done via a tube. The sensing may be done without mechanically invading the inner space of the chamber, e.g., by touching a capacitive sensor to the outer surface of the chamber in the vicinity of the opening. The sensing may be based on detection of motion of the flowable material toward the opening in a direction opposite to the direction of the outwardly directed force. The sensing may include sensing a baseline value after the delivering has begun but before the flowable material has approached the vicinity of the opening. The controlling of the delivering may include stopping the flow.

In general, in another aspect, the invention features a method of filling free space within a chamber with a flowable material via an opening in a wall of the chamber where the wall defines a longer dimension and a shorter dimension and the opening is in a portion of the wall that defines the longer dimension. The flowable material is delivered into the chamber via the opening in a manner such that, as the flowable material fills the chamber, a surface of the flowable material moves toward the opening along the longer dimension of the chamber. The approach of the surface of the flowable material toward the opening is sensed as an indication of the extent to which the free space within the chamber has been filled.

In general, in another aspect, the invention features apparatus for filling free space within a chamber with a flowable material via an opening in a surface of the chamber. The apparatus includes a flowable material conduit with an outlet end, and a mechanism for inducing an outwardly directed force arranged with respect to the outlet end of the conduit so that simultaneously the outlet end may be positioned at the opening and the mechanism for inducing the outwardly directed force may apply a force to draw the flowable material away from the outlet end.

Implementations of the apparatus may include a sensor mounted to sense the extent to which the free space has been filled with flowing material, and a controller for controlling the delivering of the flowable material in response to the sensing. The conduit and the mechanism for inducing the outwardly directed force are independent of each other. The mechanism for inducing the outwardly directed force may include a rotator that imposes a centrifugal force. The sensor may include a non-invasive capacitive sensor positioned at the opening. The flowable material conduit may pass through a hole in the sensor to reach the opening.

Among the advantages of the invention are the following.

The filling process provides rapid infusion of encapsulating material throughout the entire free volume of an assembly; is suitable for filling high density assemblies; and can be controlled to automatically stop filling when the assembly is full.

Other advantages and features will become apparent from the following description, and from the claims.

DESCRIPTION OF THE PREFERRED EMBODIMENTS

Figure 2A:
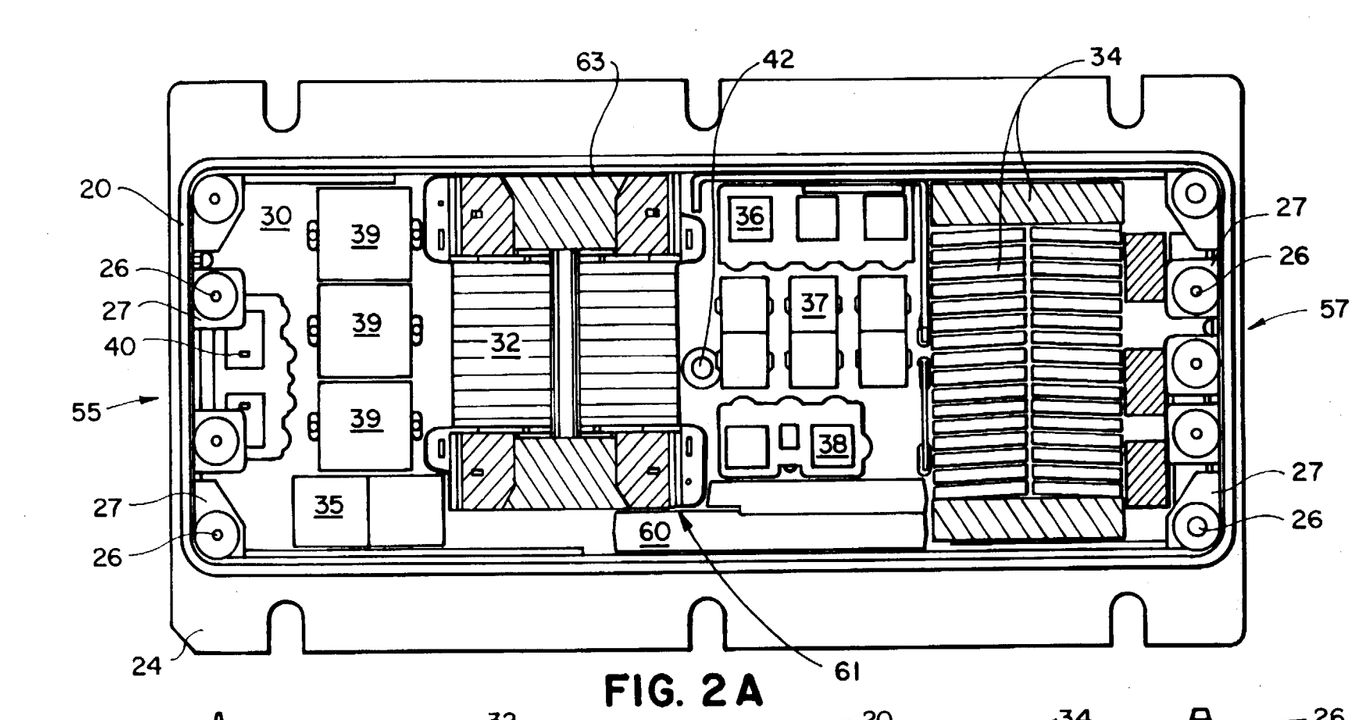
FIGS. 2A and 2B are plan and side interior views of the converter.
Figure 2B:
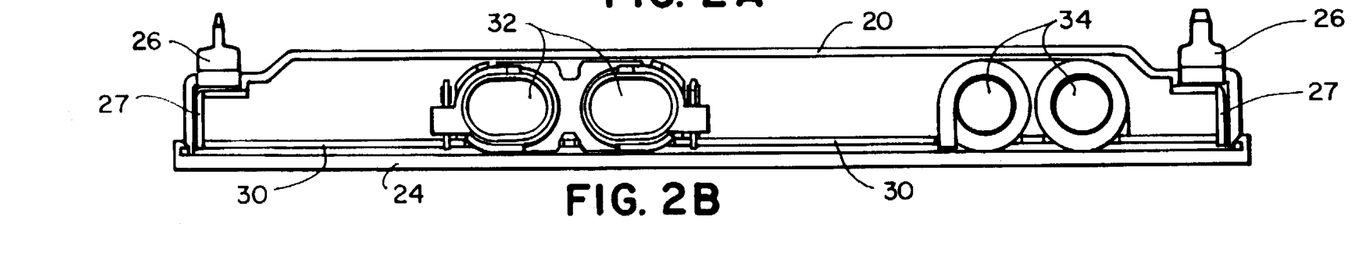

The DC—DC converter assembly in FIGS. 1, 2A, and 2B is filled with an epoxy encapsulant which, upon curing to a hardened state, performs several functions. One function is to mechanically support pins 26 by essentially completely surrounding the conductive tabs 27 to which the pins are attached. Another function is to improve heat transfer between components within the package (e.g., transformer 32; inductors 34, 35; capacitors 37, 39) and outer surfaces of the assembly. These functions require that the epoxy fill all of the internal volume of the assembly which is not otherwise occupied by other components (i.e., the "free volume", any portion of the free volume being called "free space").

Injection and pressure filling rely upon the hydraulic pressure head of the incoming liquid encapsulant to overcome friction and surface tension along flow paths around and between components. Where internal component density is high, the gravity-induced pressure head associated with injection filling may not be sufficient to drive the encapsulant into some spaces inside the assembly. For example, in the assembly shown in FIGS. 2A and 2B, the encapsulant must enter fill hole 42 and migrate around transformer 32 to reach the interior of the converter in the region of end 55. However, one end 63 of the transformer is very nearly in contact with the interior surface of the plastic case 20; the other end of the transformer, in region 61, is nearly in contact with an inner side surface of molded control assembly 60. Flow of encapsulant over the top and bottom of the transformer is also impeded, as seen in FIG. 2B, because the transformer fills virtually all of the interior height of the unit. Similarly, inductor 34 impedes the flow of encapsulant into the interior of the converter in the region of end 57.

By providing an increase in the pressure head, pressure filling can improve filling and speed the process. However, pressure filling is a more complex process to control, especially in a high volume manufacturing environment. In a high density assembly of the kind shown in FIGS. 2A and 2B, the seal between the fill hole 42 and the fill tube 102 must withstand the back pressure of the liquid encapsulant throughout the time that the encapsulant is being forced into the assembly. Should an imperfect seal occur, liquid encapsulant will be ejected around the hole and ruin the converter.

A common need in both injection and pressure filling is to know when to stop the fill. If too little encapsulant is used, a complete fill cannot occur; if too much is used, there will be overflow and ruined product. Where a large volume of assemblies are to be manufactured, dimensional tolerances associated with the different parts of the assembly will cause the free volume, and the required amount of encapsulant, to vary from unit to unit, even where units have identical parts complement. Determining when to stop the fill is also affected when there are unit-to-unit variations (e.g., some units might use a single capacitor 39; some might use two capacitors; others all three). Higher density of the assembly, less free volume, and a need to fill assemblies of different sizes on a lot-of-one basis also affect the determination of when to stop filling.

Figure 4:
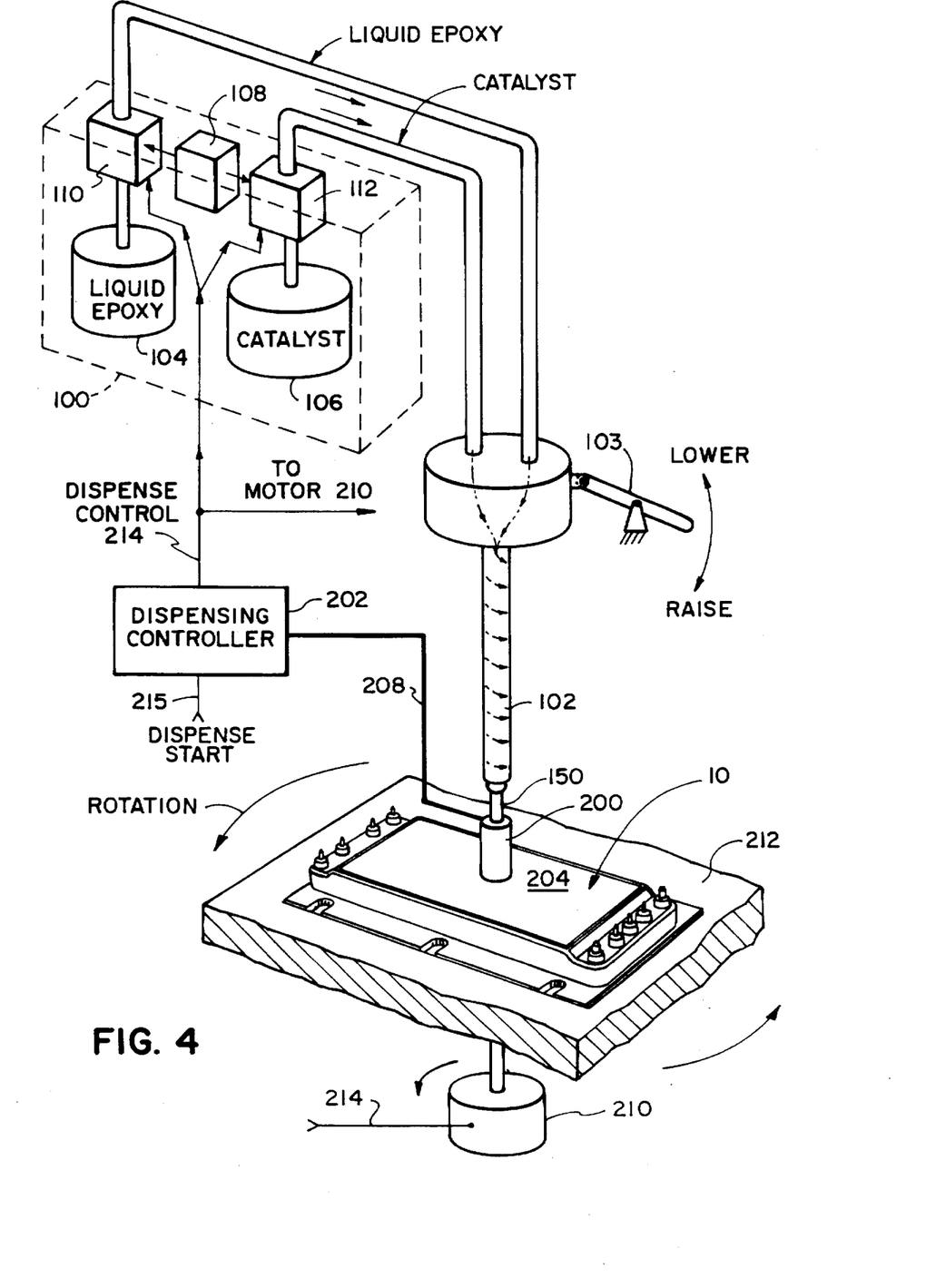
FIG. 4 is a schematic perspective view of another method of filling an assembly with a liquid.
Figure 6A:
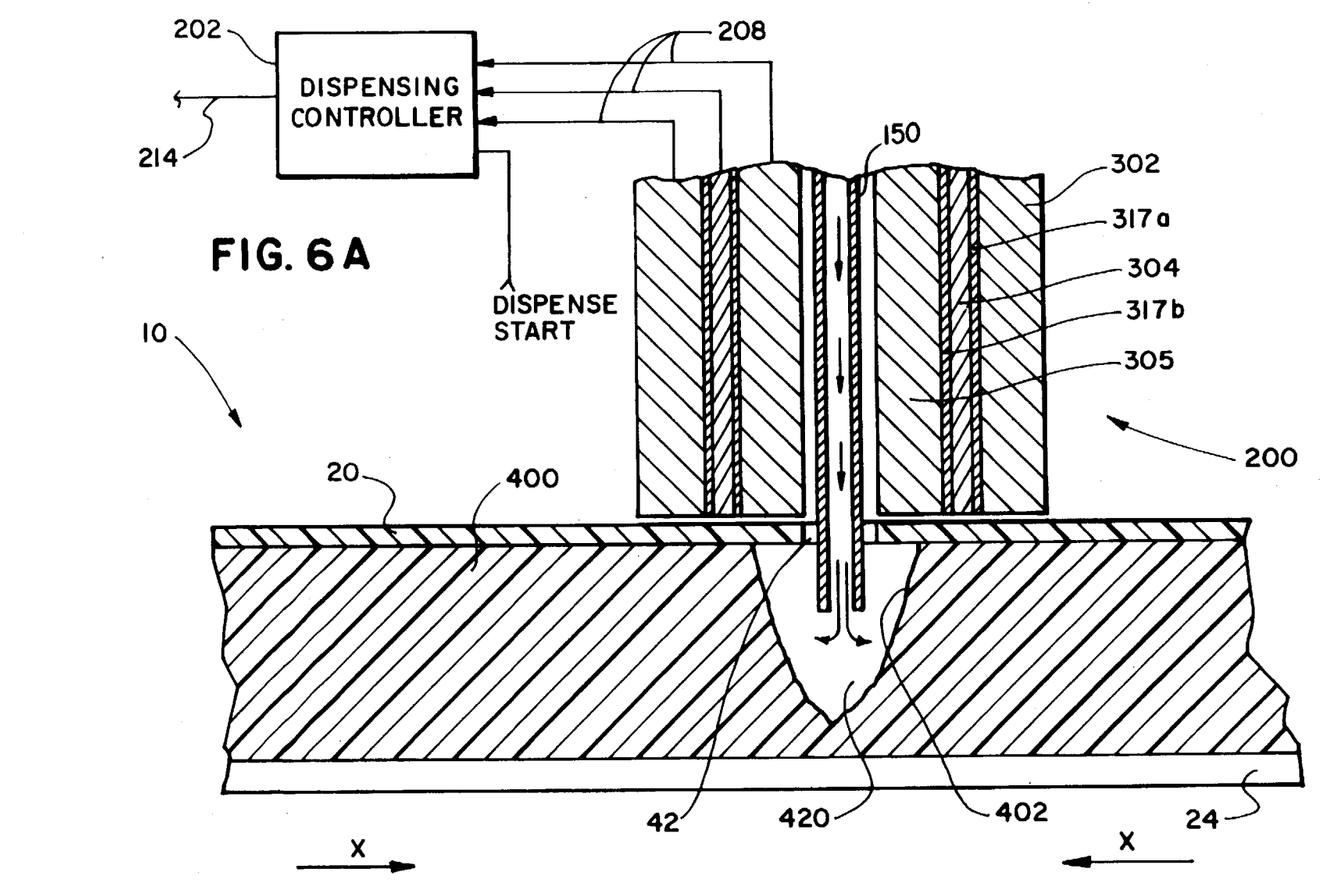
FIG. 6A is a side sectional view of a portion of the filling apparatus of FIG. 4.

FIG. 4 shows a filling process which provides rapid infusion of encapsulating material throughout the entire free volume of an assembly; is suitable for filling high density assemblies; and can be controlled to automatically stop filling when the assembly is full. In the Figure, a motor 210 rotates a horizontal fixture 212 which supports an assembly 10. A dispensing cart 100 delivers liquid epoxy resin and catalyst to a static mixing tube 102 (e.g., Static Mixer, Part Number 60/0202/50, manufactured by Liquid Control Corp., North Canton, Ohio, USA). The end of the static mixing tube is fitted with a flexible polypropylene tip 150 (e.g., part number 5115PP-B, manufactured by EFD Inc., Providence, R.I., USA) which passes through the center of a capacitive sensor assembly 200 and into the fill hole of the assembly 10 (the fill hole is not visible in FIG. 4). The subassembly comprising the static mixing tube 102, the tip 150 and the sensor are supported by a mechanism 103 (shown schematically) which allows the entire subassembly to be raised and lowered as a unit so that the end of the tip 150 may enter and be withdrawn from the fill hole in the assembly 10 without the tip being withdrawn from the sensor. (See also FIG. 6.) Neither the capacitive sensor 200 nor the static mixing tube 102 nor the tip 200 rotates. The bottom of the capacitive sensor lies in contact with the outside surface 204 of the assembly and the case of the assembly 10 rotates underneath the sensor about a vertical axis which passes through the center of the sensor 200 and tip 150.

Upon delivery of a dispense start signal 215 to the dispensing controller, the dispense control signal 214 is activated. This lowers the static mixing tube 102, tip 150 and sensor 200 so that the sensor lies on the surface of the case and the tip enters the fill hole in the assembly 10. It also initiates both the rotation of the assembly (by activating motor 210) and pumping of liquid epoxy resin and catalyst from the cart 100. The ratio of the amounts of resin and catalyst delivered is set to a predetermined value within the dispensing cart 100. The liquids are mixed in the static mixing tube 102 and delivered, via the tip 150, into the interior of the assembly 10. As the catalyzed epoxy is delivered into the assembly, the centrifugal effect of the rotation drives the liquid catalyzed epoxy away from the fill hole and towards the peripheral internal surfaces of the assembly 10. The centrifugal forces, which are dependent upon the rotational speed of the assembly, help drive the epoxy throughout the entire free volume of the assembly.

The capacitive sensor 200 is connected (via cable 208) to the dispensing controller 202 which, as explained below, measures the capacitance of the sensor and terminates the filling when the assembly is full. An initial capacitance measurement is made early in the fill cycle to determine a baseline capacitance value. During the filling process the value of capacitance is essentially continuously monitored by the dispensing controller 202 and, when the measured value of capacitance changes in a predetermined amount from the baseline capacitance value, the controller 202 resets the dispense control signal 214 which terminates the delivery of epoxy resin and catalyst, raises the mixing tube and sensor and stops rotation of the motor.

Figure 5A:
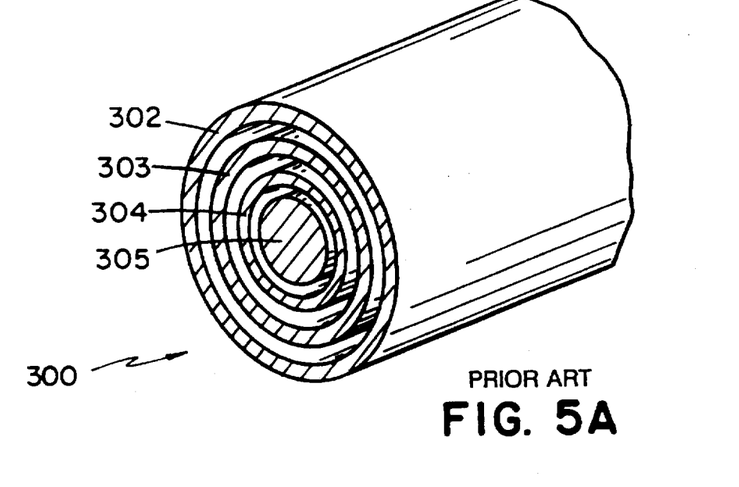
FIG. 5A is a cutaway perspective view and FIG. 5B is a schematic side view of a capacitive proximity sensor.
Figure 5B:
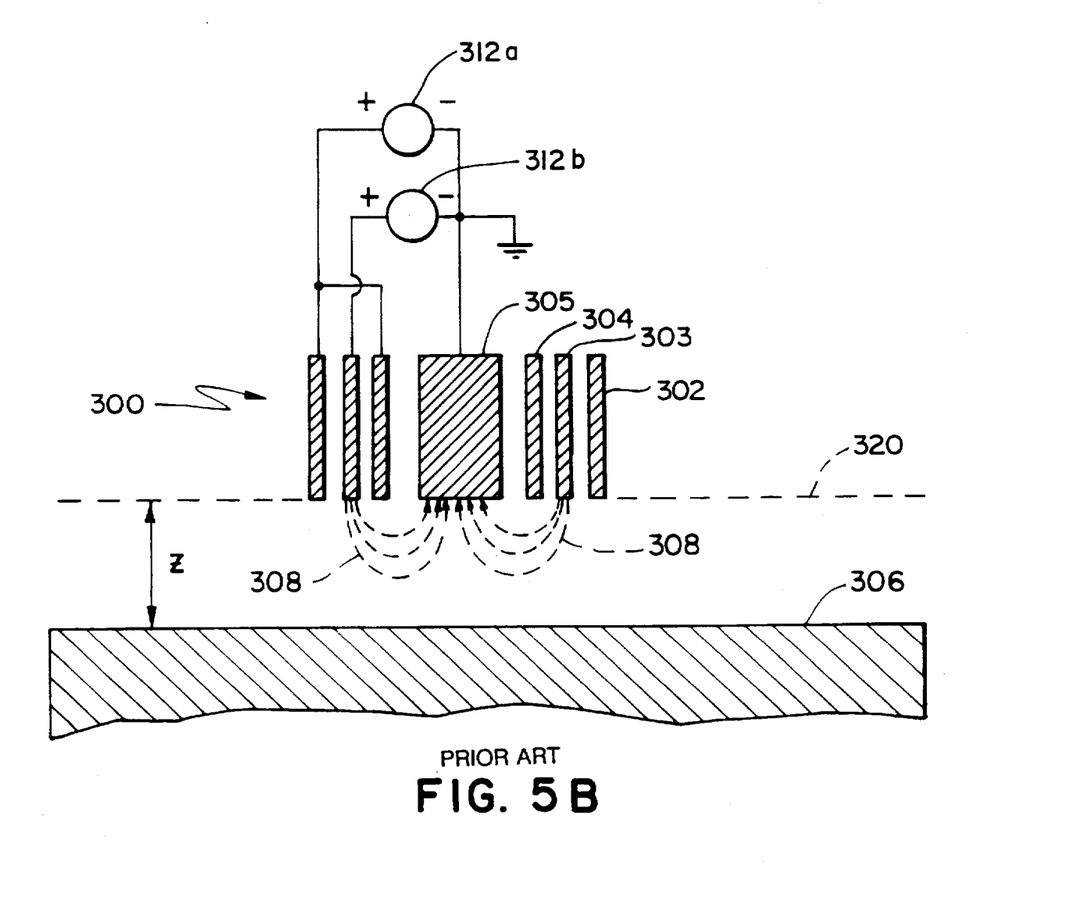

Capacitive sensor 200 is a modified version of a capacitive proximity detector. The schematic construction and operating principle of one such proximity detector are illustrated in FIGS. 5A and 5B. The sensor 300 includes four concentric conductive elements 302, 303, 304, 305 which are held in a fixed concentric relationship to each other. The pair of elements 302, 304 (the "guard" elements) and the element 303 (the "sensor" element) are driven by equal voltage sources 312a, 312b, both sources being referenced to central element 305 (the "ground" element). Since the guard elements and the sensor element are all at the same potential, no electric field will be induced between them. However, a field will be induced between the sensor element 303 and the ground element 305 and this "fringing field" 308 will pass between the ends of the elements in a region outside of the face of the sensor (the "face" is the region which lies in the plane 320 defined by the ends of the conductive elements). The sensor design results in a fringing field located near the central area of the face, making the sensor sensitive to objects located in the region of the face. Moreover, the guard element is purposely located surrounding the sensor element so that the sensor will be essentially insensitive to the presence of objects surrounding the periphery of the sensor. If an external object 306 is brought in proximity to the face of the sensor 300, along the direction z, and the object is either a conductor or has a dielectric constant different from the environment which otherwise surrounds the face (e.g., air), then the fringing field 308, and hence the capacitance, between element 303 and element 305 will be altered. Thus, the capacitance between elements 303 and 305 can be measured as an indicator of the distance along z. Capacitive proximity sensors and related sensing equipment are manufactured by Capacitec, Inc., Ayer, Mass., USA, and others.

In the present application, however, the sensor is not used primarily to sense axial proximity (e.g., distance z along the axis of the sensor) but rather primarily to measure a change in capacitance owing to the inward radial movement of a region filled with encapsulating material toward the rotational axis of the device (e.g., toward the fill hole in the directions indicated by the arrows marked "X" in FIG. 6A). The encapsulating material must, of course, have a dielectric constant which is greater than the dielectric constant of the empty free volume in order to induce a change in capacitance as it interrupts the fringing field of the sensor. Typical epoxy encapsulants have dielectric constants in the range of 2.0 to 6.0, whereas air has a dielectric constant essentially equal to 1.

Figure 5C:
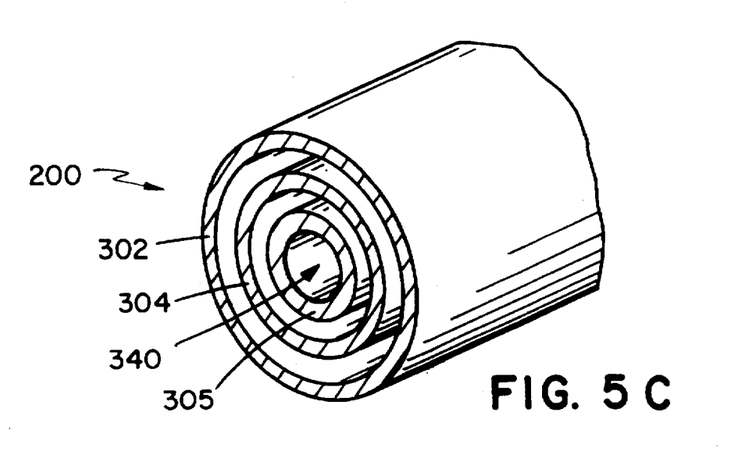
FIG. 5C is a cutaway perspective view and FIG. 5D is a schematic side view of another capacitive proximity sensor.
Figure 5D:
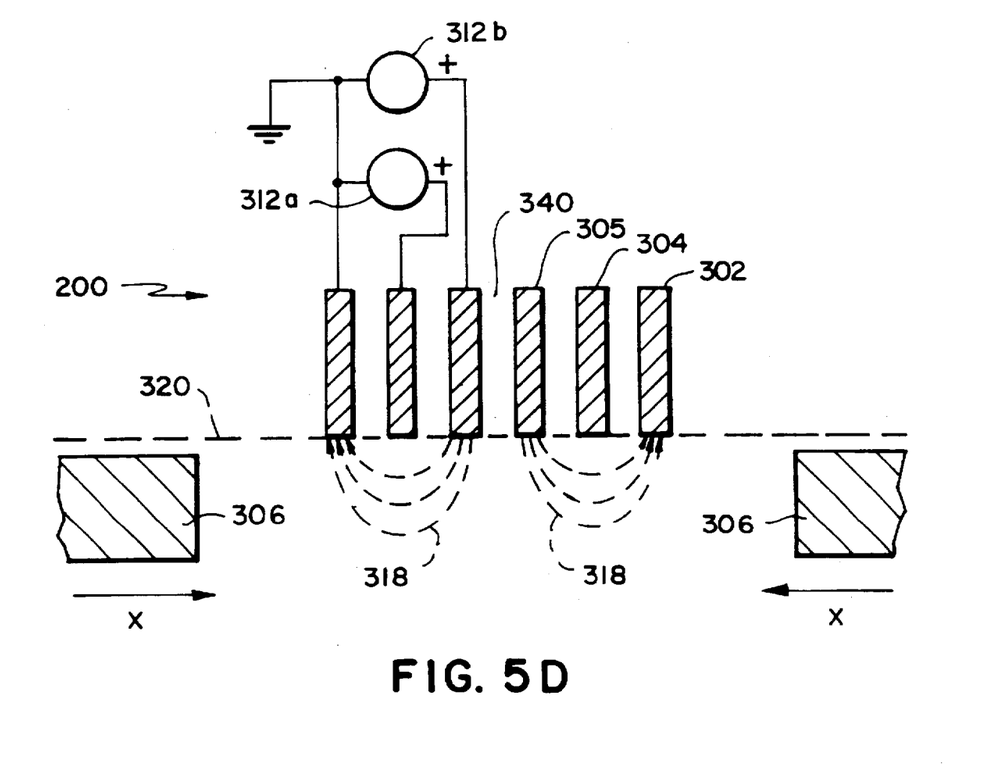

The sensor is specifically arranged for this purpose, as shown in FIGS. 5C, 5D and 6A. In the Figures, the sensor 200 has three concentric conductive elements: an inner "sensor" element 305; a "guard" element 304; and an outer "ground" element 302. The conductive elements are separated by an insulating material (e.g., insulating layers 317a, 317b in FIG. 6A). If, as described earlier, the guard and sensor elements are driven by sources 312a, 312b of equal voltage, then a fringing field 318 will be induced between the sensor and ground elements. However, where the sensor 300 of FIG. 5A and 5B has a fringing field 308 which is close to the center of the face of the sensor 300 (i.e., has a relatively narrow extent in the direction normal to z), the different arrangement of the elements in the sensor 200 of FIGS. 5C, 5D and 6A results in a field 318 which extends more broadly to the outer edges of the face (i.e., has a relatively broad extent in the direction along z). This enables earlier detection of movement of material into the region of the face of the sensor 200 because the fringing field is interrupted sooner by the leading edge of the mass of encapsulant as it moves toward the fill hole along the direction indicated by the arrows marked "X" in FIGS. 5D and 6A. Also, the sensor is further modified by the addition of a hole 340 which passes completely through the center of the unit. As shown in FIG. 6A, the hole 340 allows the tip to pass through the sensor 200 and into the interior of the assembly 10 via the fill hole 42 in the plastic case 20.

As illustrated in FIGS. 6B through 6E, during filling, liquid catalyzed epoxy flows into the interior of the assembly and is forced outward by via the centrifugal forces of rotation. (In FIGS. 6B through 6E, the chamber of the assembly is not shown as containing any components, for ease of illustration.) As epoxy is dispensed from the tip 150, it comes in contact with the interior surface of the baseplate 24 (and if the assembly contained parts, it would come into contact with the parts). The epoxy is forced to flow outward from the fill location by the effect of centrifugal force, as indicated by the arrows. The flow is away from the fill hole, in directions towards the peripheral internal surfaces of the chamber, e.g., surfaces 401, 403.

Figure 6B:
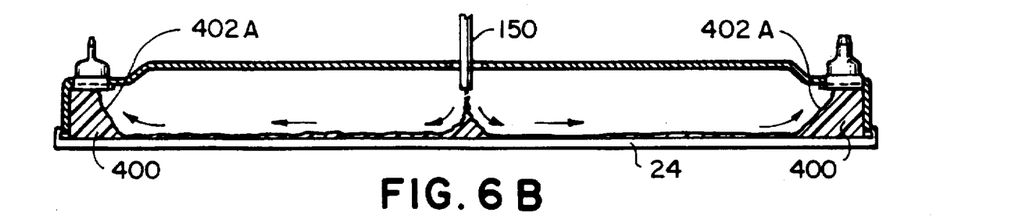
FIGS. 6B through 6E are side sectional views of an assembly being filled.
Figure 6C:
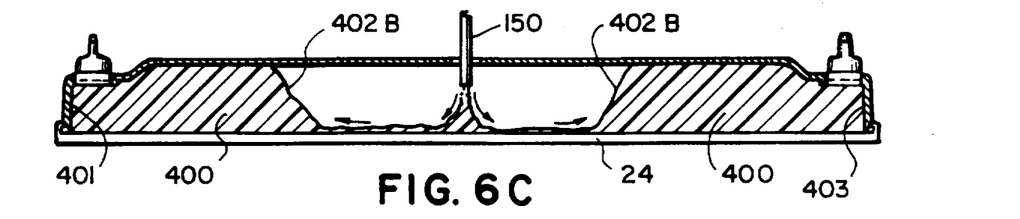
Figure 6D:
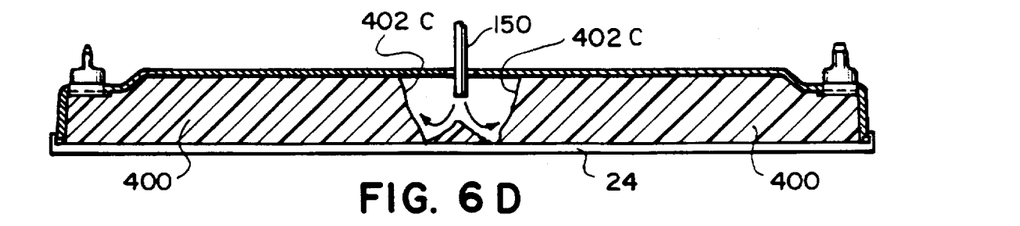
Figure 6E:
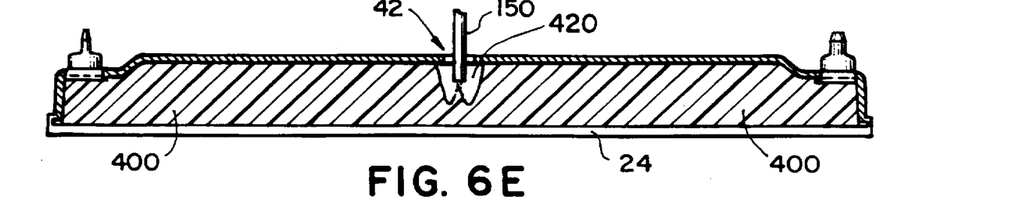

As filling progresses, the wall which demarks unfilled free space from the region of free space which has been filled with epoxy 400 moves inward toward the fill hole, as indicated by the inward movement of the interface surfaces 402a, 402b, 402c in FIG. 6B through 6D. The inward motion is in directions from the internal peripheral surfaces of the assembly toward the center of rotation. In FIGS. 6A and 6E, the filling is near completion and the unfilled region has started to form a shrinking vortex-shaped well 420 in the region of the fill hole 42. The interior of the well is occupied by air while the region around the well is occupied by liquid catalyzed epoxy 400 having a different dielectric constant. As filling continues the epoxy 400 passes radially inward underneath the sensor element 302 (FIG. 6A) causing the capacitance between elements 302 and 305 to change. The dispensing controller 202 senses this change in capacitance and, in response, resets the dispense control signal 214 which turns off the flow of catalyzed epoxy.

In injection or pressure filling the liquid is pushed inward into an assembly by a delivery force which may be due solely to a gravity-induced pressure head or which may be induced by a supplementary pressure source associated with the liquid delivery source. Such processes might be referred to as "push" processes. In the invention, the push is supplemented with an "outwardly directed force," which is independent of, and not induced by, either gravity or the liquid delivery source. The outwardly directed force moves the liquid material away from the point of entry and toward the peripheral internal surfaces of the assembly. So long as the outwardly directed forces move the liquid to the internal peripheral regions of the assembly at a rate faster than the rate at which liquid is being added by the dispensing source, there will be no backups or overflows and the filling of the free volume will progress in an inward direction from the peripheral internal regions of the assembly toward the fill hole.

An important benefit of the filling scheme illustrated in FIGS. 4 and 6A is that the filling apparatus requires very little maintenance. The sensor 200 is completely non-invasive (i.e., it does not enter the enclosed chamber of the assembly) and so never comes in contact with the liquid catalyzed epoxy. The filling scheme reduces exposure of the tip 150 to liquid epoxy, preventing clogging of the tip due to buildup of hardened epoxy around its end.

In one example of centrifugal filling, an assembly 10 of the kind shown in FIGS. 1, 2A, and 2B was filled with a mixture of epoxy resin and catalyst. The approximate outside dimensions (to the edges of the baseplate 24) of the assembly were 4.6"×2.4"×0.5". The length and width of the plastic case 20 were approximately 4.5"×1.9". The epoxy resin was Castall 301FR (having a dielectric constant of 5.6), and the catalyst was Castall E-67S, both manufactured by Castall, Inc., East Weymouth, Mass., USA. The epoxy and catalyst were both delivered by means of a Liquid Controls model CTFSD 2515 dispensing cart. The epoxy resin was maintained at a preheat temperature of 65° C. by the cart. The catalyst was not preheated. The cart was adjusted to deliver a mix ratio of 11.9 parts catalyst to 100 parts resin, by volume. The static mixing tube and the polypropylene tip were the Liquid Controls and EFD units referenced earlier.

Figure 7A:
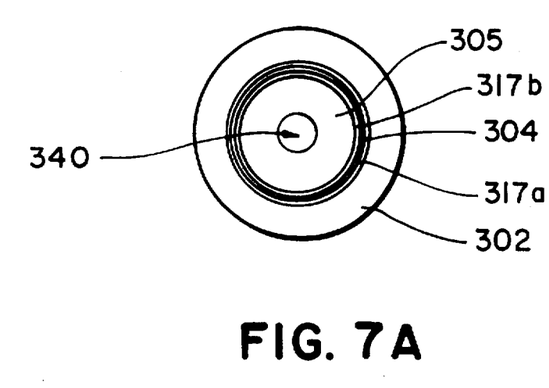
FIGS. 7A and 7B are bottom and perspective views of a capacitive sensor.
Figure 7B:
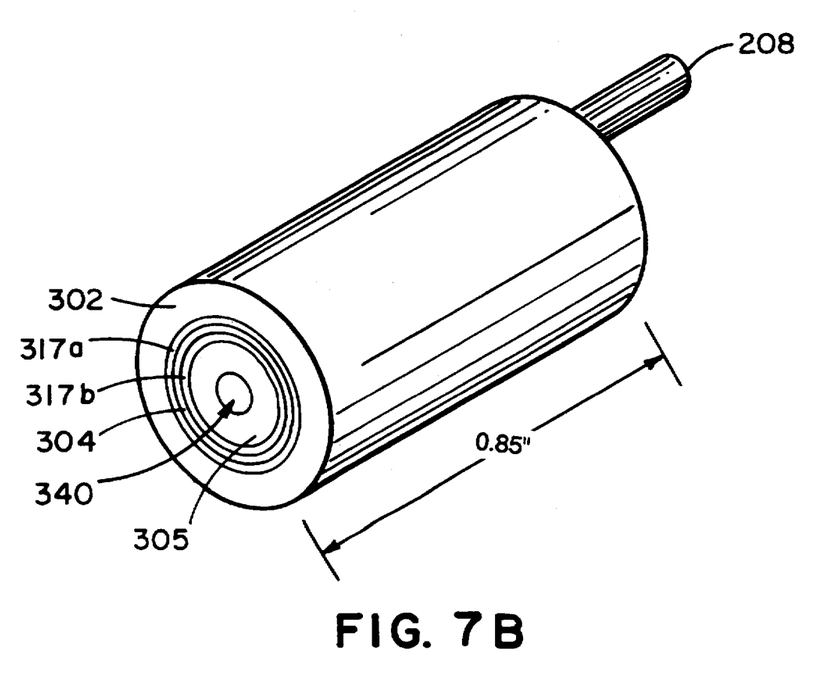
Figure 8:
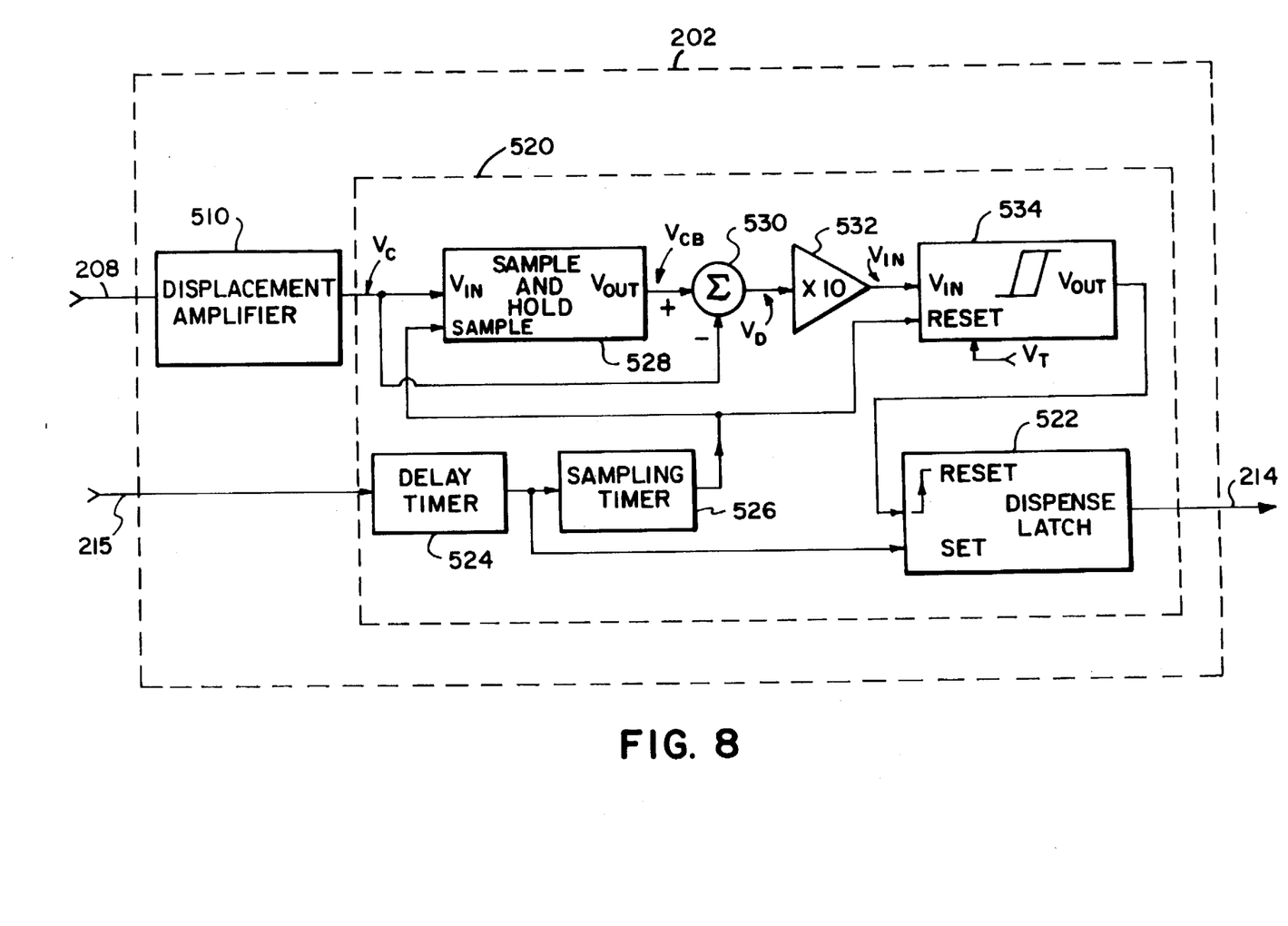
FIG. 8 is a block diagram of a dispensing controller.

A capacitive sensor, part number WPC-200, manufactured by Capacitec, Inc., and shown in FIGS. 7A and 7B, was used in conjunction with a dispensing controller 202 shown in FIG. 8. In FIG. 7A the three conductive elements: ground element 302, guard element 304 and sensor element 305 were separated by layers of insulating material 317a, 317b. The outside diameter of the ground element 302 of the sensor was approximately 0.38"; the outside diameter of the guard element was approximately 0.23"; the outside diameter of the sensor element was approximately 0.20". A 0.078" diameter hole 340 passes centrally through the entire length of the unit to allow passage of the dispensing tip.

With reference to FIGS. 4 and 8, the dispensing controller 202 may be a model number 410-SC displacement amplifier 510, also manufactured by Capacitec, Inc., together with interface circuitry 520. The displacement amplifier 510 includes circuitry which delivers an analog voltage, Vc, at a value between zero and ten volts, indicative of the capacitance of the sensor. A ten volt output indicates that material is far from the sensor; as material enters the region near the face of the sensor, the voltage Vc drops.

Upon initiation of a fill cycle (e.g., when the dispense start signal 215 is activated) a delay timer 524 is activated which sets a dispense latch 522. Setting the latch 522 activates the motor 210 to start rotation (at 1000 RPM); lowers the mixing tube 102, tip 150 and sensor 200; and signals the cart 100 to start dispensing epoxy resin and catalyst (at a dispense rate of approximately 0.66 cubic-centimeters-per-second). At the end of the delay timer interval (4 seconds) a sampling timer 526 is triggered which produces a pulse output (a few tens of milliseconds), resetting the hysteretic comparator 534 and signaling the sample and hold circuit 528 to acquire a sample. The value of the sample, Vcb, is indicative of the baseline capacitance value of the sensor for the particular assembly 10 being filled. The purpose of the delay timer is to allow a partial fill to take place before the baseline value, Vcb, is acquired. Without the delay, measurements of Vc early in the fill cycle may be corrupted by sensor noise caused by vibrations of the plastic case 20. As filling progresses, the mechanical damping effect of the encapsulant helps stabilize the reading of Vc.

As the fill progresses, the value of Vc will remain close in value to Vcb until the radially inward movement of the surface of the encapsulant well enters the region in the vicinity of the fill hole, adjacent the face of the sensor 200. At this point, Vc will begin to drop sharply, and the output of the differencing junction 530, Vd=Vcb−Vc, will start to increase sharply. The signal Vd is amplified and delivered as an input to the hysteretic comparator 534, Vin. When the value of Vin exceeds a threshold value, Vt (approximately 0.5 Volts), the positive-going edge at the output of the comparator 534 will reset the dispense latch, terminating the fill, stopping the motor and raising the tube, the tip, and the sensor.

Acquiring a baseline value of sensor output early in the fill cycle and terminating the cycle on a deviation from the baseline allows for accurate filling of assemblies irrespective of unit-to-unit variations (e.g., size and shape of assembly; internal parts complement) and other factors which might otherwise affect the absolute value of the sensor output (e.g., environmental variables, such as temperature). The scheme has been successfully used to fill assemblies of the kind shown in FIG. 1 having a variety of different internal parts arrangements as well as for filling assemblies which are half the length, but otherwise of similar dimensions and basic internal construction, as the assembly of FIG. 1.

The acceptable dispense rate and time-to-fill for a particular assembly is a function of the viscosity of the liquid being dispensed; the free volume to be filled; the density of the internal construction; and the rotational speed of the assembly. If all other factors are the same, an increase in rotational speed will increase the allowable dispense rate and decrease the fill time. However, increased rotational speed also increases the pressures within the assembly during the fill process, and these pressures must be kept below values which might cause liquid to be forced out from any seams or seals (e.g., in the assembly of FIG. 1, the seals between the case 20 and the pins 26 or between the case and the baseplate 24) or which might cause damage to internal components. For the assembly of FIG. 1, rotational speeds up to 6000 RPM were tested successfully. Dispense rates and rotational speed may, of course, be adjusted to a variety of predetermined values, either manually or automatically, to accommodate a wide variety of different kinds of assemblies.

Other embodiments are within the scope of the following claims:

What is claimed is:

1. A method of filling free space within a chamber with a flowable material via an opening in a surface of the chamber, comprising delivering, along a fill axis passing through the opening, the flowable material with a delivery force into the chamber via the opening, applying an outwardly directed force to draw the flowable material away from the opening, said outwardly directed force being independent of the delivery force, sensing the extent to which the free space within the chamber has been filled by detecting movement of a surface of the flowable material in the chamber inwardly toward the opening in a direction crossing the fill axis and past a predetermined sensing location on a wall of the chamber, and controlling the delivering of the flowable material in response to the sensing.

2. The method of claim 1 wherein the outwardly directed force comprises a centrifugal force.

3. The method of claim 1 wherein the sensing comprises capacitive sensing.

4. The method of claim 1 wherein the delivering is done via a tube.

5. The method of claim 1 wherein the sensing comprises sensing without mechanically invading the inner space of the chamber.

6. The method of claim 1 wherein the sensing is based on detection of motion of the flowable material toward the opening in a direction opposite to the direction of the outwardly directed force.

7. A method of filling free space within a chamber with a flowable material via an opening in a surface of the chamber, comprising delivering the flowable material into the chamber via the opening, applying, independently of the delivering, a centrifugal force which draws the flowable material away from the opening and towards inner surfaces of the chamber, capacitively and non-invasively sensing the extent to which the free space within the chamber has been filled by detecting movement of the flowable material in the chamber inwardly toward the opening in a direction opposite to the centrifugal force, and controlling the delivering of the flowable material in response to the sensing.

8. The method of claim 1 or 7 wherein the delivering is achieved by gravity.

9. The method of claim 1 or 7 wherein the delivering comprises pumping of the flowable material through a delivery conduit.

10. The method of claim 1 or 7 wherein the delivering of the flowable material and the applying of the outwardly directed force are during overlapping time periods.

11. The method of claim 1 or 7 wherein the sensing comprises touching a capacitive sensor to the outer surface of the chamber in the vicinity of the opening.

12. The method of claim 1 or 7 wherein the sensing includes sensing a baseline value after the delivering has begun but before the flowable material has approached the vicinity of the opening.

13. The method of claim 1 or 7 wherein controlling the delivering comprises stopping the flow.

14. A method of filling free space within a chamber with a flowable material via an opening in a wall of the chamber, the wall defining a longer dimension and a shorter dimension, the longer and shorter dimensions being greater than the depth of the chamber, the opening being in a portion of the wall that defines the longer and shorter dimensions, comprising delivering the flowable material into the chamber via the opening, during the filling, causing the flowable material to migrate toward the internal peripheral regions of the chamber such that a surface of the flowable material moves toward the opening along the longer dimension of the chamber as the chamber is filled, and sensing, along an axis parallel with at least one of the longer or shorter dimensions, the approach of the surface of the flowable material toward the opening as an indication of the extent to which the free space within the chamber has been filled.

15. The method of claim 14 further comprising controlling the delivering of the flowable material in response to the sensing.

16. The method of claim 14 wherein the delivering of the flowable material and the applying of the centrifugal force are done independently.

17. The method of claim 16 wherein the delivering of the flowable material and the applying of the centrifuqal force are done at overlapping times.

18. The method of claim 14 wherein the sensing comprises capacitive sensing.

19. The method of claim 14 wherein the delivering is done via a tube.

20. The method of claim 14 wherein the sensing comprises sensing without mechanically invading the inner space of the chamber.

21. The method of claim 14 wherein the sensing comprises touching a capacitive sensor to the outer surface of the chamber in the vicinity of the opening.

22. The method of claim 14 wherein the sensing includes sensing a baseline value after the delivering has begun but before the flowable material has approached the vicinity of the opening.

23. A method of filling free space within a chamber having a long dimension and two shorter dimensions with a flowable material via an opening in a wall of the chamber, comprising, delivering the flowable material into the chamber via the opening, during the filling, causing the chamber to be rotated about an axis of rotation passing through the opening, said axis of rotation being substantially normal to a plane defined by a first axis aligned with the long dimension and a second axis aligned with one of the shorter dimensions, and sensing the approach of the surface of the flowable material toward the opening along at least one of the first or second axis as an indication of the extent to which the free space within the chamber has been filled.

24. The method of claim 1, 7, 14, or 23 wherein the sensing is carried out at a wall from the exterior of the chamber.

25. The method of claim 23 wherein the rotational axis passes through the opening of the chamber.

26. A method of filling free space within a chamber having an opening, the method comprising:

rotating the chamber about a rotational axis passing through the chamber;

delivering a flowable material into the chamber through the opening; and sensing at a wall from the exterior of the chamber the advance of a surface of the flowable material in the chamber toward the rotational axis.

27. The method of claim 23 or 26 wherein the sensing comprises obtaining a baseline value before a predetermined point in the filling process.

28. The method of claim 23 or 26 wherein the sensing is carried out with a capacitive sensor.

* * * * *